United States Patent [19]

Yamanaka et al.

[11] 4,214,643
[45] Jul. 29, 1980

[54] AUTOMOTIVE VEHICLE POWER STEERING SYSTEM

[75] Inventors: Shogo Yamanaka, Fuji; Masanori Kouda, Atsugi, both of Japan

[73] Assignee: Atsugi Motor Parts Co., Atsugi, Japan

[21] Appl. No.: 932,481

[22] Filed: Aug. 10, 1978

[30] Foreign Application Priority Data

Jun. 13, 1978 [JP] Japan ............... 53-81477[U]

[51] Int. Cl.² ............................................. B62D 5/08
[52] U.S. Cl. .................................. 180/148; 91/375 A; 137/867
[58] Field of Search ....................... 180/148, 147, 132; 91/375 A; 137/867, 868

[56] References Cited

U.S. PATENT DOCUMENTS

| 3,180,233 | 4/1965 | Jablonsky | 91/374 |
| 3,735,832 | 5/1973 | Akima | 180/148 |

FOREIGN PATENT DOCUMENTS 1924032 11/1970 Fed. Rep. of Germany ........... 180/132

Primary Examiner—John A. Pekar
Attorney, Agent, or Firm—J. Harold Nissen

[57] ABSTRACT

An automotive vehicle power steering system including a control valve mechanism having a reduced length longitudinally of the steering wheel shaft. An annular collar is fitted over the outer periphery of the rotor, over the end of the pin which connects the rotor and the torsion bar so as to permit the seal ring for providing proper oil sealability between the housing and the rotor to be arranged much closer to the pin. Another annular collar is also fitted over the outer periphery of the rotor so as to overlie the outer periphery of the thrust bearing disposed between the rotor and the housing so as to permit the seal ring for providing proper oil sealability between the rotor and the housing to be arranged much closer to the thrust bearing. Additionally, the stub shaft has a sleeve extending inwardly a distance sufficient to carry a radial bearing for maintaining the stub shaft concentric with respect to the rotor.

6 Claims, 3 Drawing Figures

AUTOMOTIVE VEHICLE POWER STEERING SYSTEM

BACKGROUND OF THE INVENTION

1. Field of the Invention

The invention relates to an automotive vehicle power steering system including a control valve mechanism and, more particularly to improvements therein.

2. Description of the Prior Art

Power steering systems are well known which include a control valve mechanism interposed between the steering wheel shaft and the vehicle wheel operating rod and using hydraulic pressure for controlling the power applied to the operating rod in accordance with road resistance so as to provide smooth steering. However, it has been found difficult to reduce the size of the control valve system due to its inherent structure and this has become a serious limiting factor in power steering system miniaturization as described in more detail hereinafter.

SUMMARY OF THE INVENTION

Therefore, it is a primary object of the present invention to provide an improved power steering system including a miniature control valve mechanism.

Another object of the present invention is to provide an improved control valve mechanism for use in an automotive vehicle power steering system which is operable with great stability.

These and other objects are accomplished in accordance with the present invention by providing an improved control valve structure in which an annular collar is fitted over the pin connecting the rotor and the torsion bar so as to permit the seal ring for providing proper oil sealability between the housing and the rotor to be arranged much closer to the pin. Another annular collar is also fitted over the rotor and projects over the outside of the thrust bearing disposed between the rotor and the housing so as to permit the seal ring for providing proper oil sealability between the rotor and the housing to be arranged much closer to the thrust bearing. In addition, the stub shaft has a sleeve inwardly extending a distance sufficient to carry a pair of radial bearings for maintaining the stub shaft concentric with respect to the rotor. This structure permits provision of a control valve mechanism having a reduced length longitudinally of the steering wheel shaft and also stabilized rotation of the stub shaft.

Other objects and advantages of the present invention will become more apparent from the detailed description of the preferred embodiment which follow.

BRIEF DESCRIPTION OF THE DRAWINGS

In the detailed description of the preferred embodiment presented below, reference is made to the accompanying drawings wherein corresponding parts are identified by like numerals and in which.

DESCRIPTION OF THE PREFERRED EMBODIMENT

Figure 1:
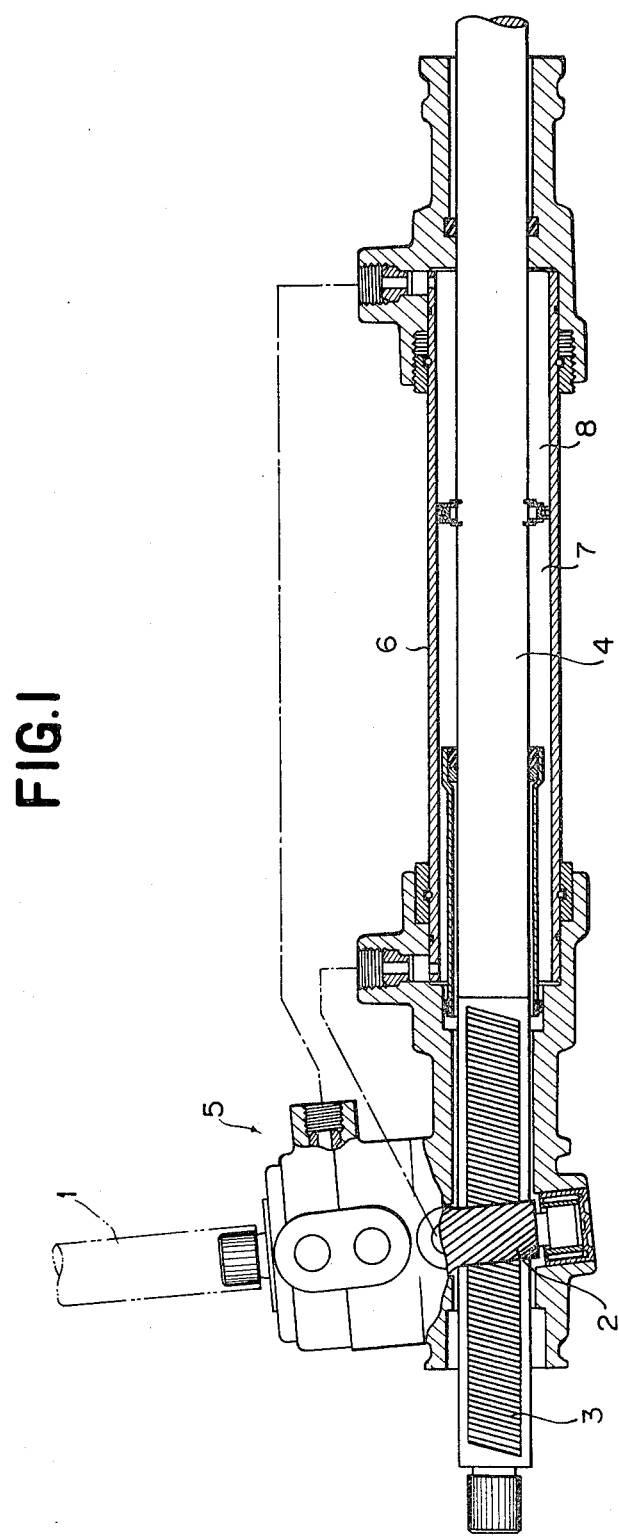
FIG. 1 is a fragmentary sectional view showing the whole structure of a prior art power steering system.
Figure 2:
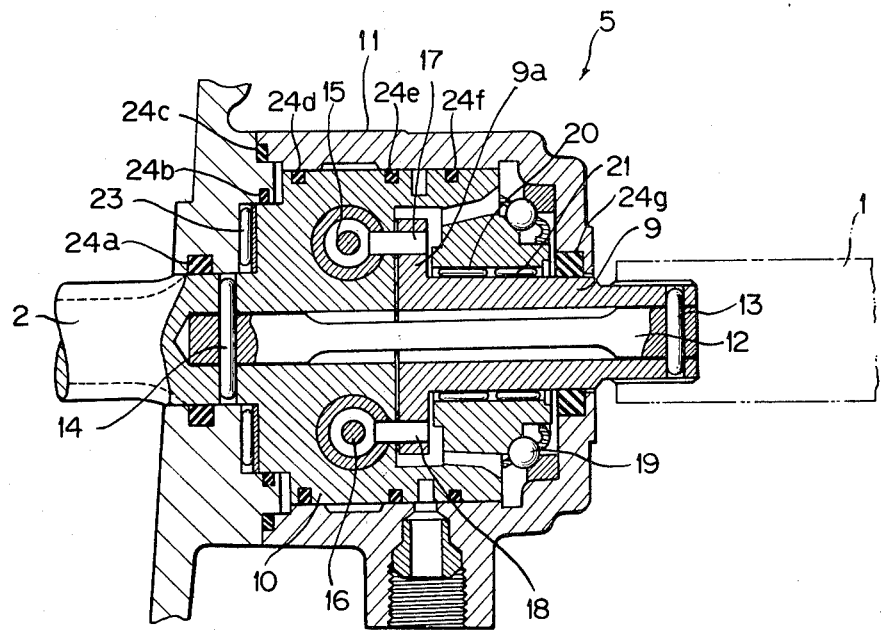
FIG. 2 is a sectional view used to explain the prior art structure of a control valve mechanism.

Referring now to the drawings and more particularly to the prior art structure of FIGS. 1 and 2, there is shown a prior art automotive vehicle steering system which includes a pinion gear 2 coupled through a commonly used control valve mechanism 5 to the steering wheel shaft 1 of the vehicle, an operation rod 4 coupled to the vehicle wheel and having thereon a rack 3 in mesh engagement with the pinion gear 2, and hydraulic pressure chambers 7 and 8 defined between the operation rod 4 and a cylinder 6 surrounding the operation rod 4. Under low road resistance conditions where there is substantially no relative angle difference between the steering wheel shaft 1 and the pinion gear 2, rotation of the steering wheel shaft 1 is directly transmitted to the pinion gear 2, causing axial displacement of the operation rod 4. On the other hand, under high road resistance conditions where there is some relative angular difference between the steering wheel shaft 1 and the pinion gear 2, the control valve mechanism 5 serves to selectively communicate one of the hydraulic pressure chambers 7 and 8 with a hydraulic pressure source and the other with a drain in accordance with the relative angular difference between the steering wheel shaft 1 and the pinion gear 2 so that the resulting hydraulic pressure difference between the hydraulic pressure chambers 7 and 8 can axially move the operation rod 4 in the direction corresponding to the relative angular difference.

The control valve mechanism 5 is illustrated in more detail in FIG. 2 which comprises a housing 11, a stub shaft 9 in the form of a hollow shaft rotatable in the housing 11 and coupled to the steering wheel shaft 1, a rotor 10 journalled in the housing 11 for rotation and coupled to the pinion gear 2, a torsion bar 12 having its one end connected to the stub shaft 9 by means of a pin 13 and the other end coupled to the rotor 10 by means of a pin 14. The rotor 10 has spool valves 15 and 16 which are moved in the directions normal to the drawing by respective pins 17 and 18 embedded in the opposite end portions of the flange 9a of the stub shaft 9 when a twist is created in the torsion bar 12 or there is a relative angle difference between the stub shaft 9 and the rotor 10 so as to communicate one of the hydraulic pressure chambers 7 and 8 (see FIG. 1) with a passage leading to the hydraulic pressure source and the other with a passage leading to the drain. The rotor 10 is rotatably supported on the housing 11 through a ball bearing 19 and the stub shaft 9 is rotatably supported concentrically with respect to the rotor 10 through two pairs of radial bearings 20 and 21 disposed between the stub shaft 9 and the rotor 10. Seal rings 24a to 24f are arranged to provide sealing engagement between the rotor 10 and the housing 11 and a seal ring 24g is arranged to provide sealing engagement between the stub shaft 9 and the housing 11.

In such conventional control valve mechanisms, the two radial bearings 20 and 21 must be arranged side by side on the outer periphery of the stub shaft 9 and on the right side of the flange 9a due to the limitation resulting from the structure of the stub shaft 9 and the rotor 10. As a result, the whole axial length of the stub shaft 9 and thus the portion of the rotor surrounding the stub shaft 9 should be sufficiently large to carry the two pairs of radial bearings 20 and 21 juxtaposed on the stub shaft 9. In addition, it is impossible in view of sealing function for the seal rings 24a and 24b to be arranged in the vicinity of the thrust bearing 23 and the pin 14 in order to provide sealing engagement between the rotor 10 and the housing should be arranged in alignment with the thrust bearing 23 and pin 14. Thus, the housing 11 is required to have axially elongated portions for provision of the seal rings 24a and 24b in a staggered relation to the thrust bearing 23 and the pin 14. This results in an axially elongated control valve mechanism and thus an extensive power steering system.

Figure 3:
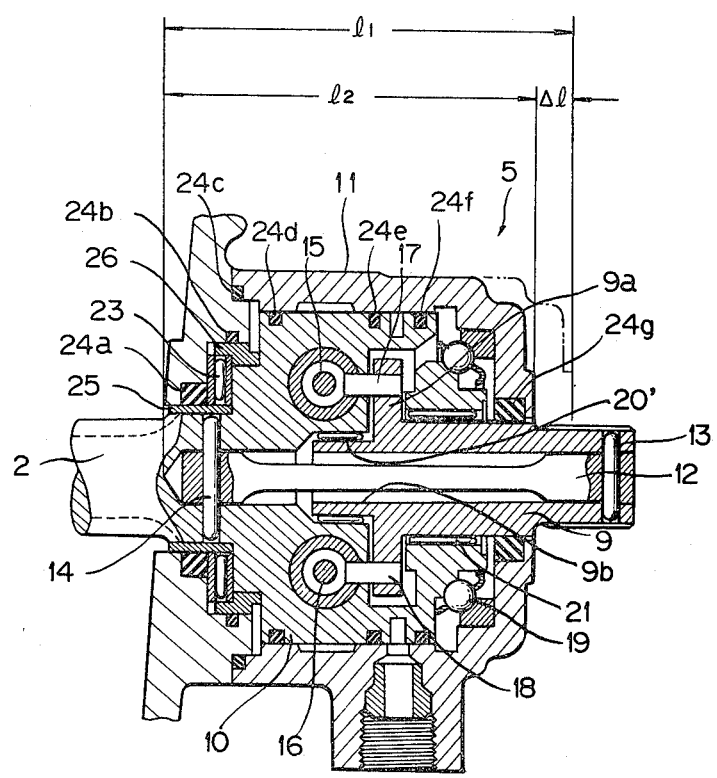
FIG. 3 is a sectional view of a control valve mechanism constructed in accordance with the teachings of the present invention.

In accordance with the present invention, an extremely advantageous and novel structure has been provided in order to reduce the axial length of the control valve mechanism. FIG. 3 illustrates one embodiment of the present invention which can eliminate the need for the axially elongated portions required in the FIG. 2 prior art control valve mechanism for provision of the seal rings 24a and 24b. An annular collar 25 is fitted on the outer periphery of the rotor 10 and over the ends of pin 14. The pin 14 connects the rotor 10 and the torsion bar 12; (and, the seal ring 24a which provides proper sealing engagement between the rotor 10 and the housing 11 is fitted in an annular groove formed in the inner surface of the housing 11 over the collar 25. Thus, the seal ring 24a can be arranged much closer to the pin 14. Also, another annular collar 26 of a stepped cross-section is fitted over the outer periphery of the rotor 10 so as to overlie the outer periphery of the thrust bearing 23 and, the seal ring 24b for providing proper sealing engagement between the rotor 10 and the housing 11 is fitted in an annular groove formed in the inner surface of the housing 11 over the collar 26. Thus, the seal ring 24b can be arranged much closer to the thrust bearing 23. This structure permits reduction of the axial length of the control valve mechanism.

In addition, the stub shaft 9 has a sleeve 9b extending from the flange 9a to the space existing between the spool valves 15 and 16, a distance sufficient to carry a pair of radial bearings 20'. Thus, the stub shaft 9 can be securely held concentrically relative to the rotor 10 by providing a radial bearing 20' on the left side portion of the stub shaft 9 relative to the flange 9a and a radial bearing 21 on the right side portion thereof. This structure permits reduction of the axial length of the right side portion of the stub shaft 9 and thus the portion of the rotor 10 surrounding the stub shaft right side portion. This structure wherein the stub shaft 9 is supported on the opposite sides of the flange 9a will stabilize rotation of the stub shaft 9.

As can be seen from FIG. 3, the control valve mechanism of the present invention (shown by the solid line) is smaller in axial length by Δl than the prior art mechanism (shown by the phantom line).

It is, therefore, apparent that there has been provided, in accordance with the present invention, a power steering system including a miniature control valve mechanism operable with great stability that fully satisfies the objects, aims and advantages set forth above. While the present invention has been described in conjunction with a specific embodiments thereof, it is evident that many alternatives, modifications and variations will be apparent to those skilled in the art. Accordingly, it is intended to embrace all alternatives, modifications and variations that fall within the spirit and broad scope of the appended claim.

What is claimed is:

1. In a power steering system for an automotive vehicle, comprising a steering wheel shaft, a pinion gear, a vehicle wheel operating rod formed with a rack in meshing engagement with the pinion gear, and a hydraulic actuator with two hydraulic pressure chambers, selective supply of hydraulic fluid under pressure to these chambers selectively impelling the wheel operating rod in the one or the other longitudinal direction:

a control valve mechanism, fitted between said steering wheel shaft and said pinion gear so that said pinion gear is rotationally driven by rotation of said steering wheel shaft, comprising:

a housing;

a rotor journalled in said housing and coupled to said pinion gear;

a stub shaft aligned coaxially with said rotor and projecting into a hole therein;

a flange on the end of said stub shaft inside the rotor, and two spool valves formed in the rotor and actuated by relative movement of the flange and said rotor, which selectively communicate the hydraulic pressure chambers to hydraulic pressure, or drain them;

a sleeve extending from said flange coaxially with said stub shaft, on the other side of said flange from said stub shaft;

a torsion bar;

a first pin connecting said torsion bar to the part of the rotor which is attached to said pinion gear;

a second pin connecting said torsion bar to said stub shaft;

a thrust bearing disposed between said rotor and said housing;

a first annular collar fitted over that part of said rotor to which said first pin is fitted, and providing a smooth outside surface;

a first sealing ring fitted over said smooth outside surface of said first annular collar, and sealing between it and said housing;

a second annular collar fitted over said rotor and projecting over the outside of said thrust bearing, and providing a smooth outside surface;

a second sealing ring fitted over the smooth outside surface of said second annular collar, and sealing between it and said housing; and, two radial bearings, one fitted between said stub shaft and said rotor, and the other fitted between said sleeve and said rotor.

2. In the power steering system as claimed in claim 1, wherein said first annular collar is fitted over the outer periphery of said first pin.

3. In the power steering system as claimed in claim 1 or 2 wherein said housing is provided in the inner surface thereof with an annular groove, and said first sealing ring is fitted in said annular groove.

4. In the power steering system as claimed in claim 1 or 2, wherein said second annular collar has a stepped cross-section.

5. In the power steering system as claimed in claim 1 or 2 in which said second annular collar is fitted over the outer periphery of said thrust bearing.

6. In the power steering system as claimed in claim 1 or 2, wherein said radial bearings are spaced from each other both axially and longitudinally of said stub shaft.

* * * * *